(12) United States Patent
Mähönen et al.

(10) Patent No.: US 9,014,232 B2
(45) Date of Patent: Apr. 21, 2015

(54) METHOD AND SYSTEM FOR OPTIMIZING THE USE OF THE RADIO SPECTRUM AND COMPUTER PROGRAM PRODUCT THEREFOR

(75) Inventors: Petri H. Mähönen, Aachen (DE); Diego Melpignano, Monza (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 1525 days.

(21) Appl. No.: 11/462,206

(22) Filed: Aug. 3, 2006

(65) Prior Publication Data

US 2007/0053410 A1    Mar. 8, 2007

(30) Foreign Application Priority Data

Aug. 4, 2005   (EP) .................................. 05016953

(51) Int. Cl.
| | |
|---|---|
| H04B 1/00 | (2006.01) |
| H04W 16/14 | (2009.01) |
| H04B 1/7163 | (2011.01) |
| H04L 27/00 | (2006.01) |
| H04B 1/707 | (2011.01) |

(52) U.S. Cl.
CPC .............. *H04W 16/14* (2013.01); *H04B 1/707* (2013.01); *H04B 1/71637* (2013.01); *H04L 27/0012* (2013.01)

(58) Field of Classification Search
CPC ....................................................... H04B 1/707
USPC ................................ 375/130; 455/67.13, 522
See application file for complete search history.

(56) References Cited

U.S. PATENT DOCUMENTS

| | | | |
|---|---|---|---|
| 5,677,927 A | 10/1997 | Fullerton et al. | 375/200 |
| 6,529,568 B1* | 3/2003 | Richards et al. | 375/346 |
| 6,882,315 B2* | 4/2005 | Richley et al. | 342/465 |
| 7,129,886 B2* | 10/2006 | Hall et al. | 342/28 |
| 7,177,341 B2* | 2/2007 | McCorkle | 375/130 |
| 7,263,333 B2* | 8/2007 | Roberts | 455/67.13 |
| 7,298,317 B2* | 11/2007 | Charpentier et al. | 342/174 |
| 7,489,720 B2* | 2/2009 | Hinton et al. | 375/138 |
| 7,492,316 B1* | 2/2009 | Ameti et al. | 342/465 |
| 7,541,968 B2* | 6/2009 | Hall et al. | 342/28 |
| 2002/0130807 A1* | 9/2002 | Hall et al. | 342/28 |
| 2003/0007576 A1* | 1/2003 | Alavi et al. | 375/329 |
| 2004/0008617 A1* | 1/2004 | Dabak et al. | 370/208 |
| 2004/0021599 A1* | 2/2004 | Hall et al. | 342/28 |

(Continued)

FOREIGN PATENT DOCUMENTS

| | | | |
|---|---|---|---|
| EP | 1560344 | 8/2005 | H04B 1/69 |
| GB | 2399475 | 9/2004 | H04Q 7/38 |

*Primary Examiner* — Santiago Garcia
(74) *Attorney, Agent, or Firm* — Allen, Dyer, Doppelt, Milbrath & Gilchrist, P.A.

(57) ABSTRACT

A system for scanning a frequency spectrum to detect usage thereof includes an ultra-wideband receiver for performing the scanning, and cooperates with a spectrum usage estimator module and a radio controller unit. The spectrum usage estimator module derives from the scanning performed via the ultra-wideband receiver information as to usage of individual bands in the frequency spectrum. The radio controller unit controls operation of a radio cognitive system as a function of the information as to usage of individual bands in the frequency spectrum as derived by the spectrum usage estimator module. The radio cognitive system operates over unused bands in the frequency spectrum.

22 Claims, 3 Drawing Sheets

(56) References Cited

U.S. PATENT DOCUMENTS

| | | | |
|---|---|---|---|
| 2004/0108954 A1* | 6/2004 | Richley et al. | 342/387 |
| 2004/0109506 A1* | 6/2004 | Hinton et al. | 375/242 |
| 2005/0083199 A1* | 4/2005 | Hall et al. | 340/552 |
| 2005/0163042 A1* | 7/2005 | Roberts | 370/208 |
| 2005/0164642 A1* | 7/2005 | Roberts | 455/67.13 |
| 2005/0220173 A1* | 10/2005 | Zyren et al. | 375/130 |
| 2005/0232336 A1* | 10/2005 | Balakrishnan et al. | 375/130 |
| 2006/0171445 A1* | 8/2006 | Batra et al. | 375/130 |
| 2007/0053410 A1* | 3/2007 | Mahonen et al. | 375/130 |
| 2008/0212650 A1* | 9/2008 | Hwang et al. | 375/130 |
| 2008/0240271 A1* | 10/2008 | Berens | 375/260 |

* cited by examiner

METHOD AND SYSTEM FOR OPTIMIZING THE USE OF THE RADIO SPECTRUM AND COMPUTER PROGRAM PRODUCT THEREFOR

FIELD OF THE INVENTION

The invention relates to techniques for optimizing the use of the radio spectrum.

BACKGROUND OF THE INVENTION

Cognitive radios have recently emerged as a new paradigm to build intelligent and spectrum-aware radio systems. The current approach with cognitive radios is to create spectrum awareness so that radio transceivers can move on to free or unused spectrum bands. The Federal Communications Commission (FCC), which is the entity that regulates spectrum usage in the U.S., is considering opening some radio and television frequencies for this sort of use.

Additionally, specific projects by the Defense Advanced Research Projects Agency (DARPA) for example, aim at extending this paradigm by defining spectrum usage policy languages (XG-project) The Institute of Electrical & Electronics Engineers (IEEE) has started work on the necessary standardization towards the rapid deployment of spectrum agile systems.

To maximize the benefit from spectrum agility, a system should be able to use very wide spectrum areas. Of course, wide spectrum is intended to mean that cognitive radio should be able to use spectrum from a large selection of bands, while the transmission itself might be narrowband.

A problem arising with cognitive radio lies in that cost-effectively scanning a wideband radio-spectrum in (near) real-time fashion is far from easy. One possible approach would involve using smart antennas with extremely wideband A/D-converters, and the supporting radio frequency circuitry. Technology adapted to support this approach is not available at the moment. Even roadmaps indicate that technology possibly made available in the future will entail a power-consumption budget quite unlikely to lead to commercially viable approaches. A possible exception may be certain military systems where very high power budgets are available.

Another approach, based on the use of several narrowband receivers, is to inefficient, with increased costs and power-consumption. Wideband scanning of frequencies (over several GHz) by using, e.g., an OFDM (Orthogonal Frequency Division Multiplexing) narrowband receiver will not lead to a scanning time fast enough, and could also be very expensive in terms of a power budget.

In fact, the prior art includes a variety of circuits and arrangements adapted to operate on very wide frequency ranges. For instance, U.S. Pat. No. 3,662,316 describes a pulse receiver for detecting short baseband electromagnetic pulses employing a dispersion-less, broadband transmission line antenna. The arrangement includes a circuit operating with a biased semiconductor diode located within the transmission line for instantaneously detecting substantially the total energy of the baseband pulse, and providing a corresponding output adapted for application in conventional utilization circuits.

As a further example, U.S. Pat. No. 5,345,471 describes an ultra-wideband (UWB) receiver utilizing a strobed input line with a sampler connected to an amplifier. In a differential configuration, +/−UWB inputs are connected to separate antennas or two halves of a dipole antenna. The two input lines include samplers which are commonly strobed by a gating pulse with a very low duty cycle. In a single ended configuration, only a single strobed input line and sampler is utilized. The samplers integrate, or average, up to 10,000 pulses to achieve high sensitivity and good rejection of uncorrelated signals.

By way of still a further example, U.S. Pat. No. 5,677,927 describes an impulse radio communications system using one or more subcarriers to communicate information from an impulse radio transmitter to an impulse radio receiver. The impulse radio communication system is an ultra-wideband (UWB) time domain system. The use of subcarriers provides impulse radio transmissions added channelization, smoothing and fidelity. Subcarriers of different frequencies or waveforms can be used to add channelization of impulse radio signals. Thus, an impulse radio link can communicate on many independent channels simultaneously by employing different subcarriers for each channel.

The impulse radio uses modulated subcarriers for time positioning a periodic timing signal or a coded timing signal. Alternatively, the coded timing signal can be summed or mixed with the modulated subcarriers and the resultant signal is used to time modulate the periodic timing signal. Direct digital modulation of data is another form of subcarrier modulation for impulse radio signals. Direct digital modulation can be used alone to time modulate the periodic timing signal or the direct digitally modulated periodic timing signal can be further modulated with one or more modulated subcarrier signals. Linearization of a time modulator permits the impulse radio transmitter and receiver to generate time delays having the necessary accuracy for impulse radio communications.

SUMMARY OF THE INVENTION

The preceding analysis of the related art demonstrates that there exists the need of defining approaches capable of scanning and exploring the frequency spectrum, e.g., in cognitive radio systems in a more satisfactory way as compared to the prior art approaches described in the foregoing.

An object of the invention is thus to provide a fully satisfactory response to that need.

According to the present invention, this object is achieved by a method having the features set forth below. The invention also relates to a corresponding system, as well as to a computer program product that is to be loaded in the memory of at least one computer and including software code portions for performing the steps of the method.

As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion. The claims are an integral part of the disclosure of the invention provided herein.

A preferred embodiment of the invention thus involves scanning a frequency spectrum to detect usage thereof via at least a portion of an ultra-wideband (UWB) receiver. From scanning performed via the UWB receiver, information is derived as to the usage of individual bands in the frequency spectrum, and operation of a radio cognitive system is controlled as a function of the information as to usage of individual bands in the frequency spectrum to operate the radio cognitive system over unused bands in the frequency spectrum.

The basic idea underlying the arrangement described herein is to re-use a basic ultra-wideband (UWB) radio architecture for performing fast and low-cost spectrum scanning, e.g., in support of a radio cognitive system. Such an arrangement will not involve setting up a complete ultra-wideband transceiver unit, but may simply require a Si or SiGe based Ultra-wideband receiver.

Alternatively, parts of the receiving unit of an existing ultra-wideband transceiver may be re-used for spectrum scanning. The ultra-wideband receiver will be constantly monitoring the full spectrum (or large parts of it), and used as a simple spectrum analyzer with very fast adaptive filters. The ultra-wideband receiver will quickly check the available power level over each spectrum band, for example, by a Fast Fourier Transform (FFT) of the received signal.

Preferably, the arrangement includes known noise-floors for different bands. A simple signal strength comparison will thus make it possible for the system to make a decision as to whether a certain spectrum portion is currently used or not, while the system will not try to perform full signal recovery to ascertain who is transmitting and what is being transmitted.

An interesting characteristic that makes an ultra-wideband (UWB) architecture ideally suited for a spectrum scanning function is its wideband range. The definition of ultra-wideband is in fact currently applied to systems having an operational bandwidth in excess of 500 MHz. A very fast signal analysis capability is thus available in a UWB system, which makes it possible for the exemplary arrangement described herein to include a single, inexpensive receiver that does not use ultra-wideband technology for communication. In fact, the arrangement employs relatively straightforward circuitry to have an ultra-wideband receiver, and the comparator against the known signal strength is also straightforward circuitry with a programmable memory (i.e., flash memory).

The arrangement described herein also lends itself to be used in those systems that already embed a full ultra-wideband transceiver. In fact, it is possible to momentarily discontinue the normal communication behavior, in coordination with the medium access control (MAC) layer, and exploit only the receiving unit to perform fast spectrum scanning.

BRIEF DESCRIPTION OF THE DRAWINGS

The invention will now be described, by way of example only, with reference to the enclosed figures, wherein.

DETAILED DESCRIPTION OF THE PREFERRED EMBODIMENTS

Figure 1:
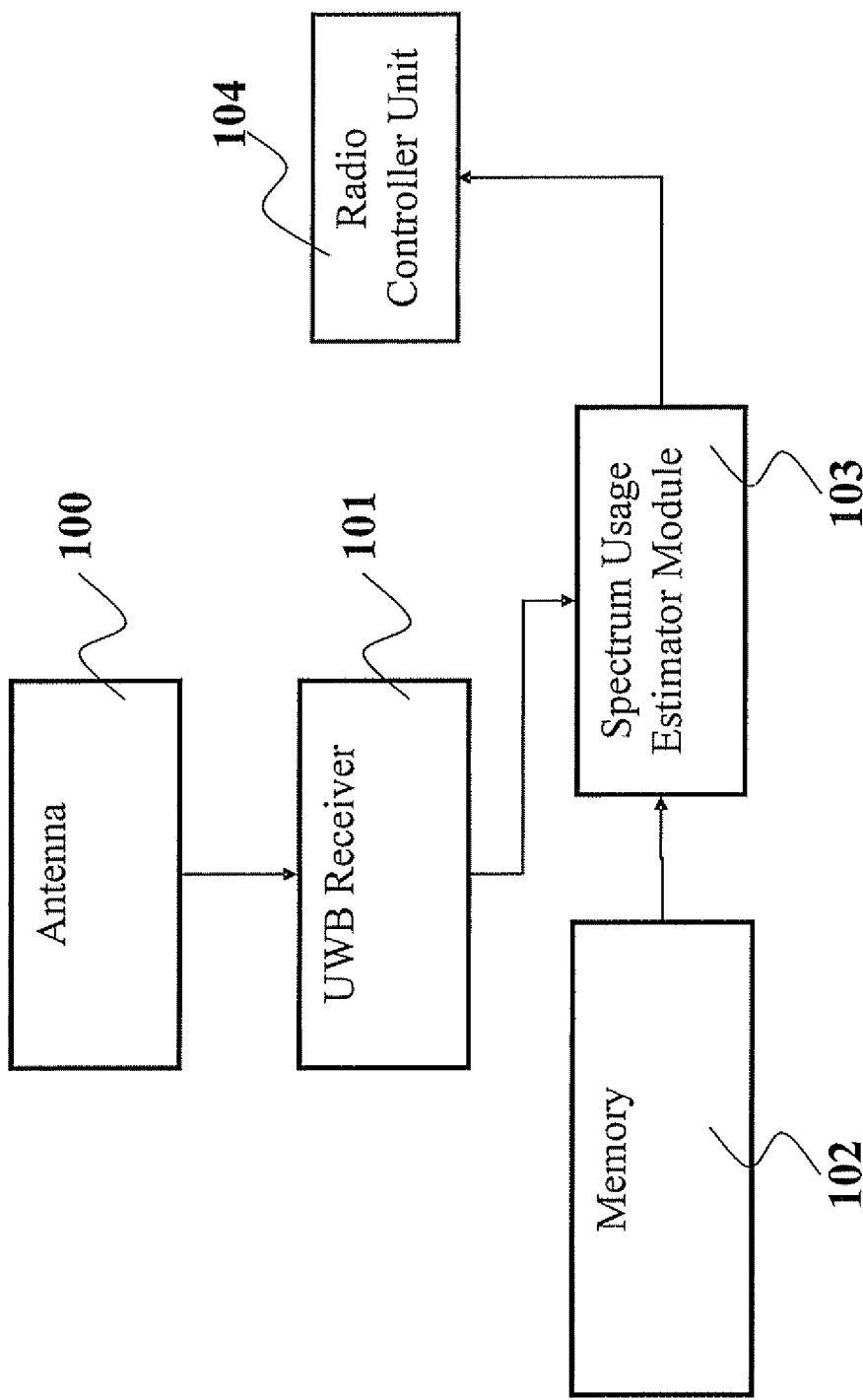
FIG. 1 shows an exemplary arrangement of a ultra-wideband receiver employed as a fast spectrum scanner in accordance with the present invention.

FIG. 1 illustrates an exemplary arrangement of a spectrum estimator for a cognitive radio system (not shown as a whole, but of any known type). The arrangement operates in association with an antenna 100 that is configured to receive electromagnetic signals, and an ultra-wideband (UWB) receiver 101 able to receive and process wideband-signals. The UWB receiver 101 may be of any known type in the art, and reference is directed to the documents cited in the background section.

It will be appreciated that the arrangement described herein properly exploits only the primary part of the UWB receiver Namely, that portion of an UWB receiver adapted to scan the frequency spectrum to find out if a signal is present over a given band. However, the UWB receiver 101 as shown herein may include extra circuits and logic required to perform full signal receiver functionality (synchronization, estimation, etch) for one or more standards. The availability of such full receiver capabilities, if cost-effective, may represent an asset, e.g., when specific processing of certain signals is important. For example, to ascertain that a signal with strength X detected in a certain band is actually of a given type, such as a GSM transmission, for instance.

Advantageously, the arrangement described herein includes a block 102 comprised of a programmable logic, memory or similar circuitry adapted to store reference values for signal strengths over various bands expected to be covered by the scanning action performed by the UWB receiver 101. This information may be arranged in the form of a threshold look-up table block, for example, and is used to verify whether the signal received is just background noise, or signal power likely to correspond to actual spectrum usage.

A spectrum usage estimator module 103 is sensitive to the output signals from the UWB receiver 101 and the block 102. On the basis of those signals, the module 103 decides whether a band under investigation (i.e., being covered by UWB scanning) is really in use. As indicated, while representing a currently preferred choice, the presence of the block 102 (e.g., in the form of a threshold look-up table) is not a mandatory requirement. In fact, the spectrum usage estimator module 103 may operate on the basis of relative signal strength peaks (compared to neighborhood bands) and time-domain signal analysis (e.g., known signal variance) for example.

In any case, the spectrum usage estimator module 103 is configured for detecting whether a signal is present over a given channel covered by the UWB scanning action. The spectrum usage estimator 103 is typically configured (in a known manner) to implement complex statistical analysis functions in the time/frequency domains to determine if a sub-band is being used, and to provide a corresponding signal/information to a radio controller unit 104 associated with the cognitive radio system (not shown).

In a preferred embodiment, the spectrum usage estimator 103 and the threshold look-up table 102 are implemented in the medium access control processor of an UWB transceiver unit.

Alternatively, to produce a low-cost system without any programmable processor embedded, the threshold look-up table 102 can be programmed via an external host. For example, this may occur by dedicated registers through an inter-integrated circuit (I2C) bus. The spectrum usage estimator circuitry 103 lends itself to a pure hardware implementation. The output is preferably returned to the host (i.e., the unit 104) over a high-speed bus, given the amount of information produced.

Figure 2:
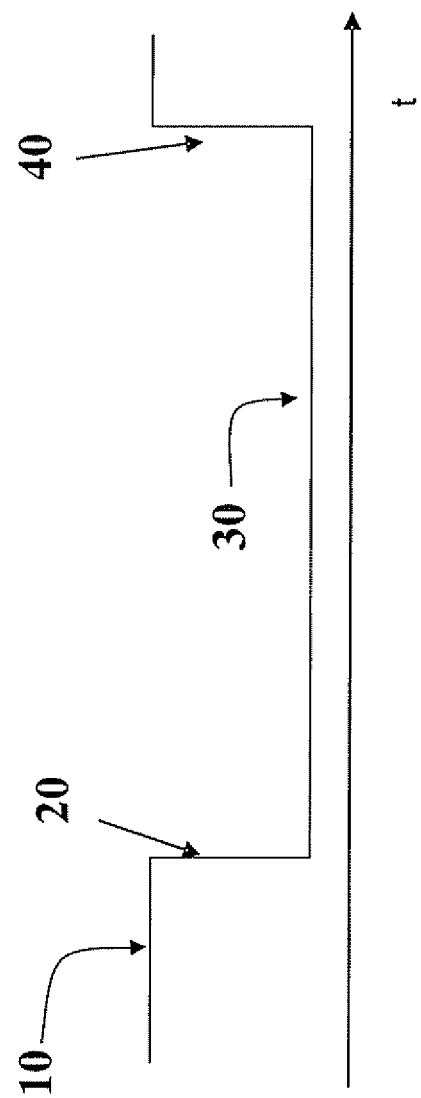
FIG. 2 is a timeline illustrating operation of the arrangement of FIG. 1.

FIG. 2 shows how a full, complete UWB transceiver can be exploited within the framework of an arrangement as illustrated in FIG. 1. Specifically, in FIG. 1, reference 10 designates a time interval in which the UWB transceiver is normally communicating. At the instant indicated by 20, the UWB transceiver is reconfigured for spectrum scanning only. Reference 30 designates a time interval over which UWB transceiver operates as a spectrum scanner within the framework of the arrangement of FIG. 1. At the instant indicated 40 the UWB transceiver is returned to normal operation and resumes communication.

It will be appreciated that the arrangement described herein is not limited to any specific UWB (pulse) radio technology, and several different alternative implementations leading to same end results can be easily envisaged by those of skill in the art. For instance, the UWB receiver may include multi-carrier (subcarrier, OFDM) circuitry, where spectrum band agility can be provided by subcarriers. Alternatively, the UWB receiver can be of the direct sequence type, where pass-band (adaptive) filters are used to provide spectrum separation for analysis.

In the simplest operational configuration, the spectrum usage estimator 103 returns only one bit per sub-band scanned to the unit 104 to indicate if the energy detected is above or below the threshold. Then the unit 104 can post-process such information over time to filter out transient effects.

In a more complex operational configuration, the spectrum usage estimator 103 returns to the unit 104 information as to the signal level per sub-band, thus providing more accurate information.

Figure 3:
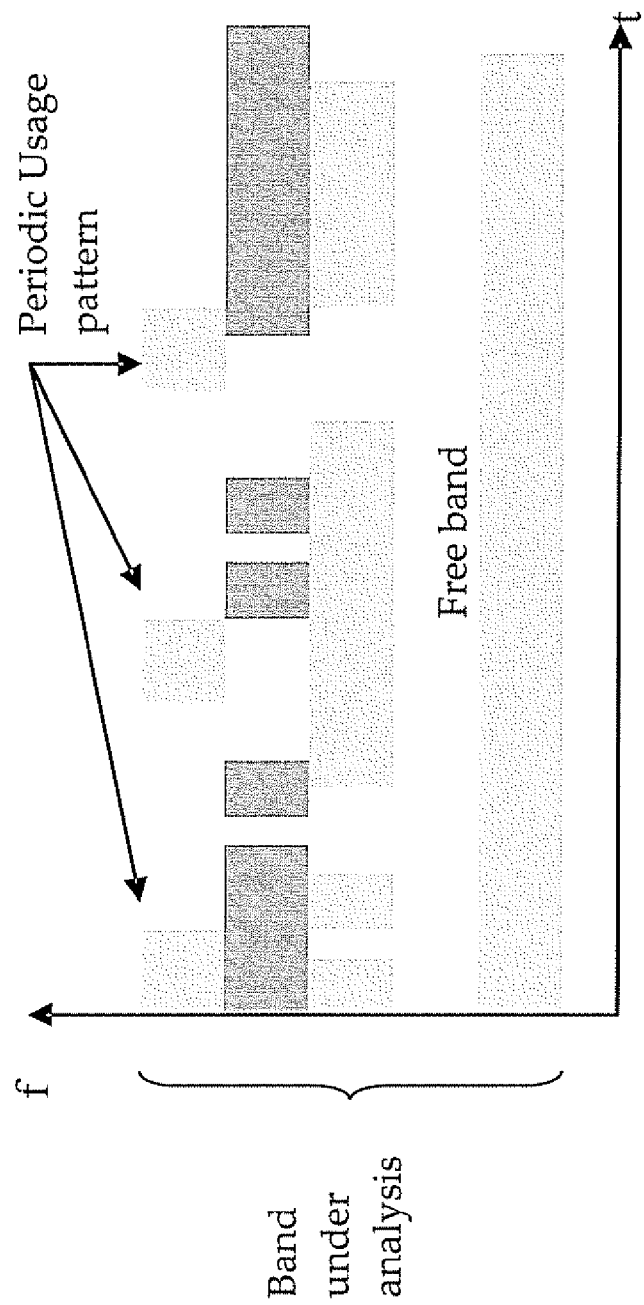
FIG. 3 is a chart illustrating an example of periodic usage patterns of the radio frequency band in accordance with the present invention.

In still another configuration, a soft decision (i.e., the estimated probability that a sub-band is being used) could be provided. The spectrum usage estimator 103 can also be able to detect usage patterns in the time domain, as shown in FIG. 3. Such as discovering that a specific sub-band is used at periodic time intervals, which depends on the traffic pattern of the users of that band.

Consequently, without prejudice to the underlying principles of the invention, the details and the embodiments may vary, even appreciably, with reference to what has been described by way of example only, without departing from the scope of the invention as defined by the annexed claims.

That which is claimed:

1. A method of scanning a frequency spectrum to detect usage thereof, the method comprising:
   performing the scanning via an ultra-wideband (UWB) receiver;
   deriving from the scanning, information on usage of individual bands in the frequency spectrum, the information including usage patterns in a time domain;
   controlling operation of a radio cognitive system based upon the information for operating the radio cognitive system over unused bands in the frequency spectrum; and
   verifying whether a signal received over a certain band is noise or a signal corresponding to spectrum usage, the verifying comprising comparing the signal received over the certain band with at least one reference value and comparing the signal received over the certain band with relative signal strength peaks in adjacent bands, the at least one reference value being retrieved from a table of references values, the references values being associated with respective signal types and frequency bands in the frequency spectrum.

2. The method of claim 1, wherein the UWB receiver is configured as a receiver portion of a UWB transceiver.

3. The method of claim 2, further comprising switching the UWB transceiver between UWB communication operations and the scanning being performed by the UWB receiver portion.

4. The method of claim 2, further comprising using the UWB transceiver to detect a type of transmission occurring over the certain band during the scanning.

5. The method of claim 1, wherein the verifying comprises a time-domain analysis of the signal received over the certain band.

6. The method of claim 1, wherein the UWB receiver is configured as a multi-carrier receiver where spectrum band agility is provided by subcarriers.

7. The method of claim 1, wherein the UWB receiver is configured as a direct sequence receiver comprising pass-band filters to provide spectrum separation for analysis.

8. The method of claim 1, wherein the information includes energy detected in an individual band corresponding to a threshold.

9. The method of claim 1, wherein the information includes an estimated probability that an individual band is being used.

10. A system comprising:
    an ultra-wideband (UWB) receiver configured to scan a frequency spectrum to detect usage thereof and comprising a detector configured to detect a signal occurring over a certain band during the scanning;
    a spectrum usage estimator module configured to derive from the scanning, information on usage of individual bands in the frequency spectrum, the information including usage patterns in a time domain, and to verify whether the signal received over the certain band is noise or a signal corresponding to spectrum usage;
    a radio controller unit configured to control operation of a radio cognitive system based upon the information derived from the scanning so that the radio cognitive system is operated over unused bands in the frequency spectrum; and
    a circuit configured to store a table of references values, the references values being associated with respective signal types and frequency bands in the frequency spectrum;
    said spectrum usage estimator module configured to verify whether the signal received over the certain band is noise or the signal corresponding to spectrum usage by at least comparing the signal received over the certain band with at least one reference value from the table of reference values and comparing the signal received over the certain band with relative signal strength peaks in adjacent bands.

11. The system of claim 10, wherein said UWB receiver is configured as a receiver portion of a UWB transceiver.

12. The system of claim 11, wherein the UWB transceiver is configured to be selectively switchable between UWB communication operations and the scanning being performed by the UWB receiver portion.

13. The system of claim 10, wherein said spectrum usage estimator module is configured to perform the verifying using a time-domain analysis of the signal received over the certain band.

14. The system of claim 10, wherein said UWB receiver is configured as a direct sequence receiver comprising pass-band filters to provide spectrum separation for analysis.

15. The system of claim 10, wherein said UWB receiver is configured as a direct sequence receiver comprising pass-band filters to provide spectrum separation for analysis.

16. The system of claim 10, wherein the information includes energy detected in an individual band corresponding to a threshold.

17. The system of claim 10, wherein the information includes an estimated probability that an individual band is being used.

18. A non-transitory tangible computer-readable medium having computer-executable instructions for causing a computer to scan a frequency spectrum to detect usage thereof by performing steps comprising:
    performing the scanning via an ultra-wideband (UWB) receiver;

deriving from the scanning, information on usage of individual bands in the frequency spectrum, the information including usage patterns in a time domain;

controlling operation of a radio cognitive system based upon the information for operating the radio cognitive system over unused bands in the frequency spectrum; and verifying whether a signal received over a certain band is noise or a signal corresponding to spectrum usage, the verifying comprising comparing the signal received over the certain band with at least one reference value and comparing the signal received over the certain band with relative signal strength peaks in adjacent bands, the at least one reference value being retrieved from a table of references values, the references values being associated with respective signal types and frequency bands in the frequency spectrum.

19. The non-transitory computer-readable medium of claim 18, wherein the UWB receiver is configured as a receiver portion of a UWB transceiver, the UWB transceiver being used to detect a type of transmission occurring over the certain band during the scanning.

20. The non-transitory computer-readable medium of claim 18, wherein the verifying comprises a time-domain analysis of the signal received over the certain band.

21. The non-transitory computer-readable medium of claim 18, wherein the information includes energy detected in an individual band corresponding to a threshold.

22. The non-transitory computer-readable medium of claim 18, wherein the information includes an estimated probability that an individual band is being used.

* * * * *

UNITED STATES PATENT AND TRADEMARK OFFICE
CERTIFICATE OF CORRECTION

PATENT NO. : 9,014,232 B2
APPLICATION NO. : 11/462206
DATED : April 21, 2015
INVENTOR(S) : Mahonen et al.

It is certified that error appears in the above-identified patent and that said Letters Patent is hereby corrected as shown below:

In the claims

| | |
|---|---|
| Column 5, Line 53 | Delete: "references values, the references values" |
| Claim 1 | Insert: --reference values, the reference values-- |
| | |
| Column 6, Line 28 | Delete: "references values" |
| Claim 10 | Insert: --reference values-- |
| | |
| Column 6, Line 29 | Delete: "references values" |
| Claim 10 | Insert: --reference values-- |
| | |
| Column 7, Line 15 | Delete: "references values, the references values" |
| Claim 18 | Insert: --reference values, the reference values-- |

Signed and Sealed this
Twenty-ninth Day of December, 2015

Michelle K. Lee
*Director of the United States Patent and Trademark Office*